Dec. 22, 1964    M. TILLER    3,161,936
APPARATUS FOR FORMING PERIPHERAL GROOVES IN CONCRETE PIPES
Filed Feb. 4, 1963    2 Sheets-Sheet 1
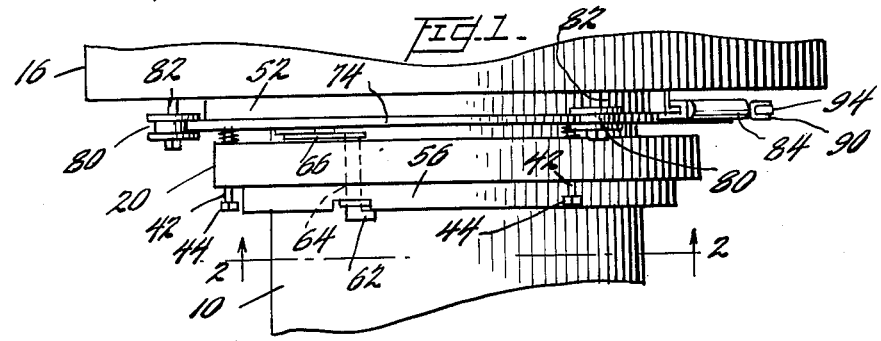
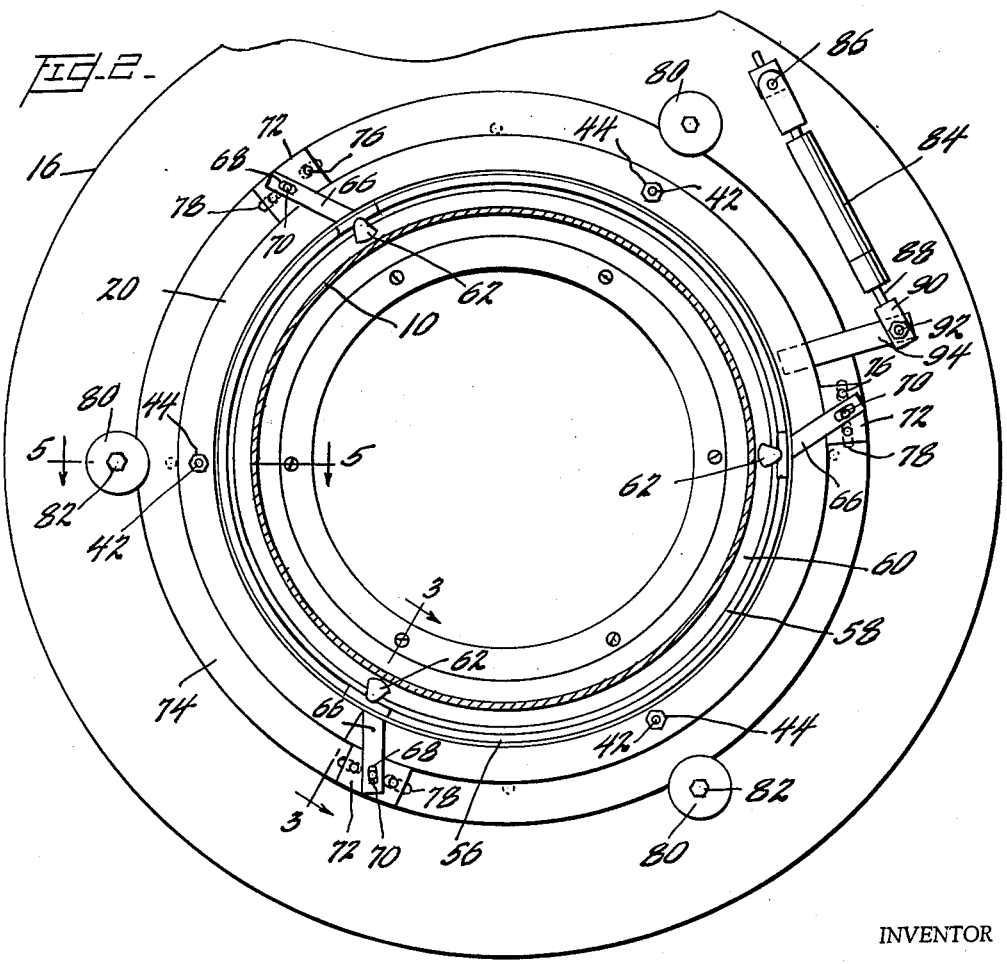
INVENTOR
Milton Tiller,
BY Parker and Walsh
ATTORNEYS

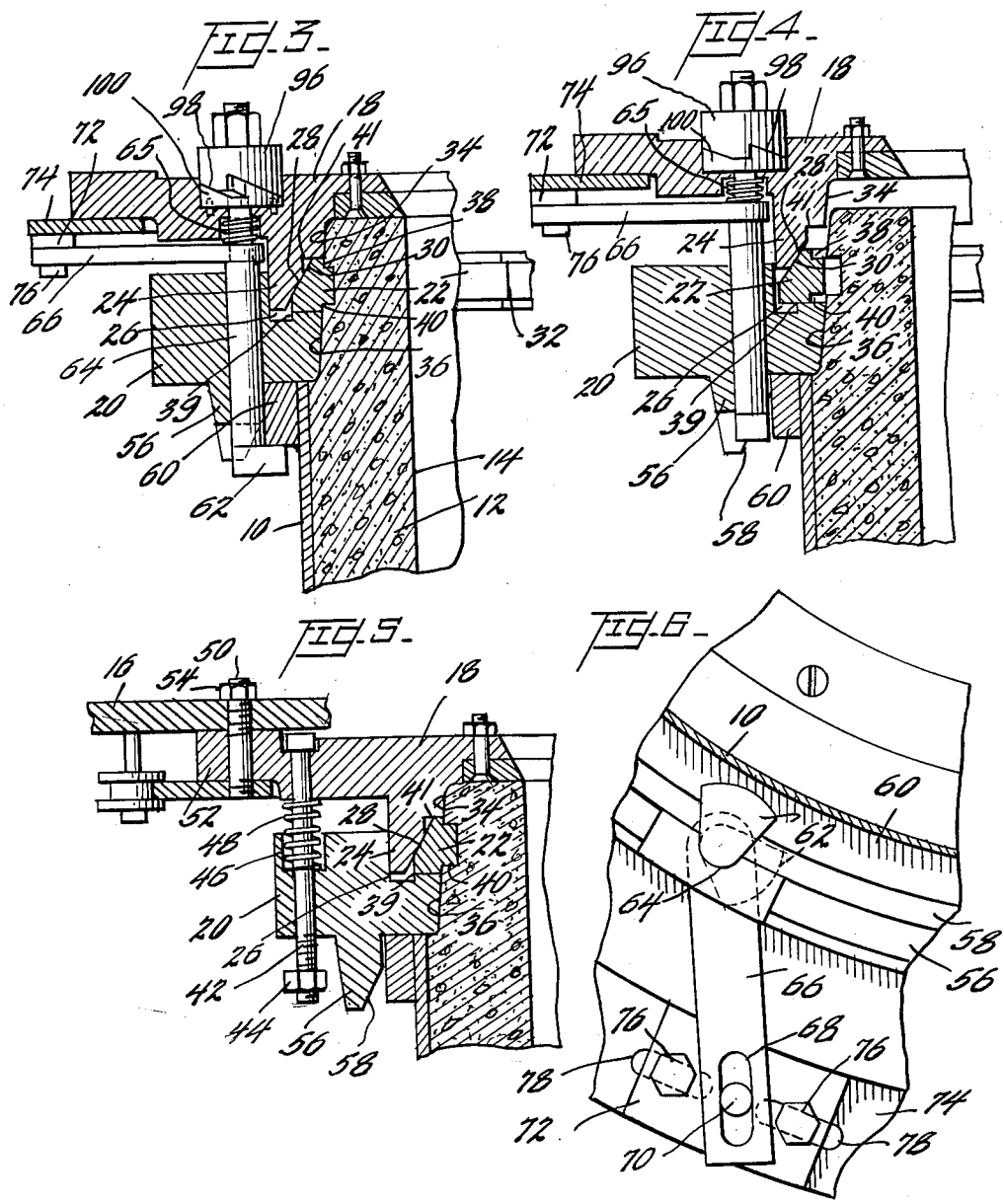

United States Patent Office 3,161,936
Patented Dec. 22, 1964

3,161,936
APPARATUS FOR FORMING PERIPHERAL
GROOVES IN CONCRETE PIPES
Milton Tiller, Sioux City, Iowa, assignor to Concrete
Pipe Machinery Company, Sioux City, Iowa, a corporation of Iowa
Filed Feb. 4, 1963, Ser. No. 256,057
12 Claims. (Cl. 25—39)

This invention relates to machinery for forming concrete pipe, and particularly to a device for forming a peripheral groove or channel in one member of a telescoping pipe joint, for reception of a sealing ring. The current trend in the concrete pipe field is for precision made joints, involving the use of rubber gaskets to prevent both infiltration into, and leakage from, a pipe system. As a result, the industry has generally adopted the use of O-rings, and this requires the manufacture of concrete pipe to close tolerances. The system involves a groove in the male end of a pipe, to receive a rubber gasket, which will form a water-tight connection when the female end of the pipe is forced down over it.

With respect to precision manufacture of the groove, the problem has been most successfully dealt with by the split ring system, wherein a split ring is included as part of the mold at the male end of the pipe, and is removed with the formed pipe after molding, where it remains for about a day, until after set and cure of the concrete, after which it can be spread for removal. This requires a stock of split rings equal to the number of pipes molded during an interval equal to the curing period, and this amounts to a figure which is well nigh prohibitive. Furthermore, the snap rings have been carried by what is known as a cap ring, removal of which was also impossible for a matter of hours, requiring caps in stock equal to about 25 percent of a day's run of pipes.

It is therefore a general object of the invention to provide economies in the use of groove-forming rings in machines for molding concrete pipe.

It is also a principal object of the invention to provide a mold system for concrete pipe, having a groove-forming ring which is removable from the groove immediately upon completion of the pipe-forming operation.

More particularly, it is an object to provide a two-part pallet for forming the end of a concrete pipe, the parts of which move together and apart, axially, and provide a camming action to a split ring, to move it radially inwardly against the spreading force of its own resilience.

Alternatively stated, it is an object to provide a normally substantially open split ring, the ends of which are caused to approach, to position the ring for the groove-forming operation, and are permitted to separate, for removal of the ring.

These and other objects, which will be apparent, are attained by the present invention, a preferred form of which is described in the following specification, as illustrated in the drawing, in which:

FIGURE 1 is a fragmentary view, in elevation, of the upper end of a mold, showing a part of the hopper, and parts of the pipe-end-forming pallet carried thereby;

FIGURE 2 is a transverse sectional view, taken on the plane of the line 2—2 of FIGURE 1;

FIGURE 3 is a sectional view, enlarged, through the cam-actuated locking finger, taken on the line 3—3 of FIGURE 2;

FIGURE 4 is a view similar to FIGURE 3, showing an adjusted position of the locking finger, separation of the pallet parts, and expansion of the split ring;

FIGURE 5 is a sectional view, enlarged, of a detail showing one of the pallet-coupling bolts, and the suspension means for the cam finger actuating ring, taken on the line 5—5 of FIGURE 2; and FIGURE 6 is an enlarged, fragmentary view of the cam finger actuating lever shown in the vicinity of the line 3—3 of FIGURE 2.

Referring to the drawings by characters of reference, there is shown a main, cylindrical molding jacket 10, in which is formed an annular, concrete pipe 12. The latter, which has an inner surface 14, of uniform bore, may be formed in any convenient manner, but preferably by the use of what is known in the industry as the rotating packer head, which forms the bore while progressing gradually upward, axially of the mold.

The pallet, at the upper end of the mold, which is used to form the tongue, or male end of the pipe, is a three-part system, carried as a whole by a hopper 16, and comprising an upper ring 18, a lower ring 20, and the intermediate, split ring 22. The rings 18, 20 are interfitted, for guided, axial, telescopic movement, the purpose of which is to cam the split ring 22, so that it closes, and moves radially inwardly, to working position. Thus, upper ring 18 has a depending, annular flange 24, cooperating with an upwardly open, annular channel 26 in the lower ring 20. Depending flange 24 has a bevelled, lower, inner portion 28, which coacts with a similarly slanted surface 30 on the upper, outer portion of split ring 22, to provide the camming action. The split in ring 22 is indicated at 32 in FIGURE 3. The inner surfaces 34, 36, respectively of rings 18 and 20, form portions of the male tongue on the pipe 12, and ring 22 has upper and lower, shouldered portions or annular rabbets 38, 40 which produce continuations of the male tongue surfaces, and also define the annular bead or rib which forms the O-ring channel in the male tongue.

The inner wall 39 of annular channel 26 is much lower than the top of ring 20, so as to accommodate the split ring 22, and flange 24 of the upper ring has a rabbeted corner 41. As seen in FIGURES 3 and 5, the top and bottom of ring 22 engage the rabbeted portion 40 and the top of wall 38, in the position of closest approach of the upper and lower rings, in which position the split ring is also closed.

The rings 18 and 20 are loosely held together, for retaining them as a unit but permitting telescoping movement, by means of three bolts 42, which pass through aligned bores in the rings, and are secured by nuts 44. A suitable counterbore 46, in the top of lower ring 20, accommodates a compression, coil spring 48, which serves to keep the rings normally at maximum separation permitted by the adjustment of nut 44, in which position (FIGURE 4) the split ring 22 is also spread.

The pallet system of rings is carried by the hopper 16, by virtue of a bolt 50, passing through a bore in a flange or ear 52 on ring 18, and also through a bore in hopper 16, being secured above the latter by a nut 54.

As understood in the art, the hopper is movable upwardly, by means not here shown, to clear the top of the mold for preliminary stripping of the pallet from the male tongue. In this movement the spring 48 will come into action to separate the rings 18 and 20, and permit ring 22 to expand, and thus move out of the O-ring groove which it formed. Conversely, the rings 18 and 20 may be urged together upon lowering of the hopper, with split ring 22 moving radially inwardly, to working position. In this downward movement of the pallet as a whole, the system is centered on the mold jacket 10 by means of a plurality of fingers or flanges 56, depending from ring 20, which have tapered, inner surfaces 58, cooperating with the upper, outer corner of an outer reinforcing ring 60, secured to mold jacket 10, at its upper end.

The stresses engendered by the working of the axially moving packer head are such as to seriously disturb the pallet ring system, and for this reason, means are provided for clamping the system securely to the reinforcing ring 60. Thus, a clamping foot 62 is carried on the lower end of a shaft 64, journalled to aligned bores in rings 18 and 20, the foot 62 being swingable into position under ring 60, or out of the way thereof. Turning motion for each shaft is communicated by a lever 66, keyed to the shaft, and having, at its outer end, an elongate slot 68, engaging a pin 70, carried by a plate 72, carried by a rotating ring 74, and adjustable thereon by virtue of a pair of bolts 76, engaging in elongate slots 78 in the ring. The ring 74 has three-point, rolling support by the engagement of its periphery in spools 80, secured to the underside of hopper 16 by depending rods 82. A compression spring 65 puts a continued, downward bias on shaft 64.

Ring 74 is rotated, to provide the latching movement, by means of a hydraulic or air cylinder 84, pivoted as at 86, to the underside of the hopper, and the piston rod 88 of which carries a fork 90, which is pivoted by a pin 92 to a lever arm 94, fixed to ring 74.

A clamping action in an axial direction is superimposed on the latching action by virtue of a cam arrangement, in which a cylindrical head 96 fixed to shaft 64 has ratchet-like, helical cam surfaces 98, of limited length, cooperating with similar surfaces on a lower, cylindrical head 100, fixed to the upper ring 18. It will be evident that upon descent, and follow through, by the hopper 16, the parts will move from positions such as shown in FIGURE 4, to positions wherein the foot 62 is below the lower edge of ring 60, and may therefore be moved thereunder by action of the power cylinder 84. At this stage, the split ring may or may not be at its radially innermost, and closed position. If not, its adjustment will be completed by action of the clamping mechanism, which not only draws the entire pallet assembly down into tight engagement with the mold jacket, but also provides a force tending to move the pallet ring axially together.

With split ring 22 properly positioned, the pipe 12 is formed by action of the packer head. At the completion of this forming operation, the cycle of movements is reversed, with clamping foot swung outwardly, and the hopper 16 raised, carrying with it the upper ring 18, and permitting split ring 22 to expand under its own resilience, and thus move out from the groove which it formed in the pipe tongue. During this outward movement of ring 22, the lower ring 20 is held down by the compressive action of coil springs 48, and this prevents any axial movement of ring 22, which would cause damage to the groove.

While a certain, preferred embodiment has been shown and described, various modifications will be apparent, in the light of this disclosure, and the invention should not, therefore, be deemed as limited, except insofar as shall appear from the spirit and scope of the appended claims.

I claim:

1. For forming an annular groove in the outer surface of molded products, a composite molding head comprising an outer ring, an inner ring, and an intermediate ring of split construction, said outer ring having an annular flange and said inner ring having an annular channel telescopically receiving said flange, radially outwardly of said intermediate ring, said outer ring and said intermediate ring having complementary slant surfaces whereby, upon axial approach of said outer ring to said inner ring, said intermediate ring is cammed radially inwardly and closed against a resilient bias normally holding it open, said outer and inner rings having inner molding surfaces and said intermediate ring having an inner molding surface extending radially inwardly of the molding surfaces of said outer and inner rings when fully closed for forming said annular groove in a molding operation, means on said outer and inner rings limiting axial approach thereof by contact with said intermediate ring, a series of bolts journalled in aligned bores of said outer and inner rings limiting axial separation of said outer and inner rings and including coil spring means biasing said rings axially apart, a clamping latch device comprising a plurality of shafts each journalled in aligned bores of said outer and inner rings and each having a latching foot inwardly of said inner ring, cam means carried by each said shaft and arranged to move said outer ring axially toward said inner ring upon rotation, a hopper secured to said outer ring, a clamp-actuating ring supported by said hopper and arranged for rotation relative to said outer and inner rings, a lever carried by each said shaft, pivotal means connecting said levers to said clamp-actuating ring and power means to move said clamp-actuating ring.

2. For forming an annular groove in the outer surface of molded products, a composite molding head comprising an outer ring, an inner ring, and an intermediate ring of split construction, said outer ring having an annular flange and said inner ring having an annular channel telescopically receiving said flange radially outwardly of said intermediate ring, said outer ring and said intermediate ring having complementary, slant surfaces whereby, upon axial approach of said outer ring to said inner ring, said intermediate ring is cammed radially inwardly and closed against a resilient bias normally holding it open, said outer and inner rings having inner molding surfaces, and said intermediate ring having an inner molding surface extending radially inwardly of the molding surfaces of said outer and inner rings when fully closed for forming said annular groove in a molding operation, means on said outer and inner rings limiting axial approach thereof by contact with said intermediate ring, a series of bolts journalled in aligned bores of said outer and inner rings limiting axial separation of said outer and inner rings and including coil spring means biasing said rings axially apart, a clamping latch device comprising a plurality of shafts each journalled in aligned bores of said outer and inner rings and each having a latching foot inwardly of said inner ring, cam means carried by each said shaft and arranged to move said outer ring axially toward said inner ring upon rotation, a hopper secured to said outer ring, and means carried by said hopper, and arranged to rotate said shafts.

3. For forming an annular groove in the outer surface of molded products, a composite molding head comprising an outer ring, an inner ring, and an intermediate ring of split construction for forming said groove, said outer ring having an annular flange and said inner ring having an annular channel telescopically receiving said flange, radially outwardly of said intermediate ring, said outer ring and said intermediate ring having complementary slant surfaces whereby, upon axial approach of said outer ring to said inner ring, said intermediate ring is cammed radially inwardly and closed against a resilient bias normally holding it open, means on said outer and inner rings, limiting axial approach thereof by contact with said intermediate ring, a series of bolts journalled in aligned bores of said outer and inner rings limiting axial separation of said outer and inner rings and including coil spring means biasing said rings axially apart, a clamping latch device comprising a plurality of shafts journalled in aligned bores of said outer and inner rings and each having a latching foot inwardly of said inner ring, cam means carried by each said shaft, and arranged to move said outer ring axially toward said inner ring upon rotation, a hopper secured to said outer ring, and means carried by said hopper, arranged to rotate said shafts.

4. For forming an annular groove in the outer surface of molded products, a composite molding head comprising an outer ring, an inner ring, and an intermediate ring of split construction for forming said groove, said outer ring having an annular flange and said inner ring having an annular channel telescopically receiving said flange, radially outwardly of said intermediate ring, said outer ring and said intermediate ring having complementary slant surfaces whereby, upon axial approach of said outer ring to said inner ring, said intermediate ring is cammed radially inwardly and closed against a resilient bias normally holding it open, a series of bolts journalled in aligned bores of said outer and inner rings limiting axial separation of said outer and inner rings and including coil spring means biasing said rings axially apart, a clamping latch device comprising a plurality of shafts each journalled in aligned bores of said outer and inner rings and each having a latching foot inwardly of said inner ring, cam means carried by each said shaft and arranged to move said outer ring axially toward said inner ring upon rotation, a hopper secured to said outer ring, and means carried by said hopper, arranged to rotate said shafts.

5. For forming an annular groove in the outer surface of molded products, a composite molding head comprising an outer ring, an inner ring, and an intermediate ring of split construction for forming said groove, said outer ring having an annular flange and said inner ring having an annular channel telescopically receiving said flange, radially outwardly of said intermediate ring, said outer ring and said intermediate ring having complementary slant surfaces whereby, upon axial approach of said outer ring to said inner ring, said intermediate ring is cammed radially inwardly and closed against a resilient bias normally holding it open, means to limit axial separation of said outer and inner rings and including spring means biasing said rings axially apart, a clamping latch device comprising a plurality of shafts each journalled in aligned bores of said outer and inner rings and each having a latching foot inwardly of said inner ring, cam means carried by each said shaft and arranged to move said outer ring axially toward said inner ring upon rotation, a hopper secured to said outer ring, and means carried by said hopper, arranged to rotate said shafts.

6. For forming an annular groove in the outer surface of molded products, a composite molding head comprising an outer ring, an inner ring, and an intermediate ring of split construction for forming said groove, said outer ring having an annular flange and said inner ring having an annular channel telescopically receiving said flange, radially outwardly of said intermediate ring, said outer ring and said intermediate ring having complementary, slant surfaces whereby, upon axial approach of said outer ring to said inner ring, said intermediate ring is cammed radially inwardly and closed against a resilient bias normally holding it open, means to limit axial separation of said outer and inner rings, and including spring means biasing said rings axially apart, clamp means slidably extending through said outer and inner rings, and having a clamping foot inside said inner ring, a hopper secured to said outer ring, and means carried by said hopper, adapted to actuate said clamp means.

7. For forming an annular groove in the outer surface of molded products, a pair of telescopically mating rings having inner surfaces for molding, said rings having inner, annular recesses, a split ring received in said recesses, a slant surface in one of said recesses and a cooperating slant surface on said split ring for camming said split ring radially inwardly to a closed position, with its inner surface located inwardly of the said inner surfaces of said mating rings for forming said annular groove in a molding operation, means limiting axial separation of said mating rings, spring means urging said mating rings apart, axially, and power means to bias said mating rings together, thereby closing said split ring.

8. For forming an annular groove in the outer surface of molded products, a pair of telescopically mating rings having inner surfaces for molding, said rings having inner, annular recesses, a split ring received in said recesses, a slant surface in one of said recesses and a cooperating slant surface on said split ring for camming said split ring radially inwardly to a closed position, with its inner surface located inwardly of the said inner surfaces of said mating rings for forming said annular groove in a molding operation, and means limiting axial separation of said mating rings, power means to bias said mating rings together, thereby closing said split ring, and to move said mating rings apart, thereby releasing said split ring from said molded product, connective means for said telescopically mating rings, for limiting axial movement thereof, and means engaging at least one of said mating rings for removing said rings from the molded product simultaneously, the product remaining stationary during the removal operation.

9. For forming an annular groove in the outer surface of molded products, a pair of telescopically mating rings having inner surfaces for molding, said rings having inner, annular recesses, a split ring received in said recesses, a slant surface in one of said recesses and a cooperating lant surface on said split ring for camming said split ring radially inwardly to a closed position, with its inner surface located inwardly of the said inner surfaces of said mating rings for forming said annular groove in a molding operation, power means to bias said mating rings together, thereby closing said split ring, and to move said mating rings apart, thereby releasing said split ring from said molded product, connective means for said telescopically mating rings, for limiting axial movement thereof, and means engaging at least one of said mating rings for removing said rings from the molded product simultaneously, the product remaining stationary during the removal operation.

10. For forming an annular groove in the outer surface of molded products, a pair of rings arranged for limited axial telescopic movement, mating annular recesses in adjacent inner corners of said rings, a normally open, split ring for forming said groove received in said recesses, and means to move said split ring radially inwardly to closed position in response to axial approach of said pair of rings, said split ring when expanded lying wholly radially outwardly of the inner, molding surfaces of said pair of rings, power means for initiating said axial approach, and for moving said pair of rings axially apart, thereby releasing said split ring from said molded product, connective means for said pair of rings, for limiting axial movement thereof, and means engaging at least one of said pair of rings for removing said rings from the molded product simultaneously, the product remaining stationary during the removal operation.

11. In a device as in claim 10, spring means urging said pair of rings apart, axially.

12. A device as in claim 10, a latch means slidably and rotatably journalled in aligned bores through said pair of rings, means to rotate said latch means, and cam means on said latch means cooperating with cam means on one of said pair of rings to urge said pair of rings axially together.

References Cited by the Examiner

UNITED STATES PATENTS

| 1,475,032 | 11/23 | Shrum et al. | |
| 1,576,127 | 3/26 | Austin | 225—39 |
| 2,955,322 | 10/60 | Hite | 25—127 |
| 3,020,594 | 2/62 | Makowski. | |
| 3,124,857 | 3/64 | Delisle | 25—39 |

MICHAEL V. BRINDISI, *Primary Examiner.*

ROBERT E. WHITE, *Examiner.*